United States Patent
Quail

(10) Patent No.: US 7,353,984 B2
(45) Date of Patent: Apr. 8, 2008

(54) ELECTRICAL SHOCKING DEVICE FOR DEFENCE TRAINING

(76) Inventor: Jeffrey James Quail, 25 Settlers Taril, St. Andrews, Maniroba (CA) R1A 2V3

( * ) Notice: Subject to any disclaimer, the term of this patent is extended or adjusted under 35 U.S.C. 154(b) by 313 days.

(21) Appl. No.: 11/111,814

(22) Filed: Apr. 22, 2005

(65) Prior Publication Data

US 2006/0038002 A1 Feb. 23, 2006

Related U.S. Application Data

(60) Provisional application No. 60/601,997, filed on Aug. 17, 2004.

(51) Int. Cl.
*B68B 11/00* (2006.01)
*F41B 15/04* (2006.01)
(52) U.S. Cl. .................. 231/7; 361/232; 463/47.3
(58) Field of Classification Search .............. 231/7; 361/232; 463/47.3, 47.4; 89/1.11

See application file for complete search history.

(56) References Cited

U.S. PATENT DOCUMENTS

| 1,283,772 | A | * | 11/1918 | Holtzman | 42/53 |
| 2,805,067 | A | * | 9/1957 | Ryan | 473/570 |
| 5,986,872 | A | | 11/1999 | Chaput | |
| 6,791,816 | B2 | | 9/2004 | Stethem | |
| 2004/0264098 | A1 | | 12/2004 | Eccles | |

\* cited by examiner

*Primary Examiner*—Rob Swiatek
(74) *Attorney, Agent, or Firm*—Ryan W. Dupuis; Michael R. Williams; Adrian D. Battison

(57) ABSTRACT

An electrical shocking device is used for realistic defence training against edge weapons such as a knife. The device includes a handle and blade body shaped to resemble a knife. Spaced apart contacts along the edge of the blade body are selectively coupled to a voltage source for delivering an electrical shock through the contacts when contacted. The voltage source delivers a non-incapacitating electrical shock to produce a fear response in the person being trained without injuring or incapacitating the person. The voltage applied can be incrementally increased as training progresses.

18 Claims, 4 Drawing Sheets

ELECTRICAL SHOCKING DEVICE FOR DEFENCE TRAINING

This application hereby claims the benefit under 35 U.S.C. Section 119(e) of U.S. provisional application 60/601,997 filed Aug. 17, 2004.

FIELD OF THE INVENTION

The present invention relates to an electrical shocking device and more particularly relates to a method of using the electrical shocking device to train a person for defence against an edge weapon.

BACKGROUND

The use of force and self-defence training has a long history that extends back to antiquity, when individuals of high standing required protection. Over the millennia, systems and styles of defence were devised to make best use of materials and innovations with the goal of providing the best possible preparation for those doing the guarding. The histories of all cultures from the past to the present show a great number of such innovations. All efforts were made to train and condition soldiers, police, and protectors to do their work with the greatest efficiency possible.

In today's high stress society fraught with every danger, our police, soldiers and protectors have become vulnerable; easy prey for those with untoward intentions. Our police must live by the highest standards of conduct, including all circumstances surrounding physical conflict in the field. The paradox is that while they are in the greatest danger the police are at the same time expected to exercise the greatest restraint. A dramatic increase in the use of deadly weapons coupled with a blatant disrespect for all authority has made a difficult job much harder.

When an attack occurs the policeman's body responds by injecting a large quantity of adrenalin precipitating a flight or fight response. When this occurs several things happen; a dramatic increase in strength, increase heart rate and blood pressure, narrowing focus on the point of danger and most notably a sharp reduction of higher brain function. In this high anxiety state the policeman unaccustomed to such duress will react with untrained instinct, over or under reacting. This may result in either the policeman or the assailant being hurt or killed.

It is desirable therefore to make use of "state specific training", which means that the physiological and psychological state that humans will be in during a real attack must be reproduced during dynamic training exercises. If this state of acute stress is replicated during training, the individual's physiological and psychological state will be congruent with their state during a real attack. This means they will be able to draw on their training to assist in their survival.

The prior art training tools include rubber, wooden, or other non-threatening dull edged training knives. There are numerous distributors that sell these types of inexpensive training knives over the internet, in store, or via other distribution channels. There are a few competitors who claim their knife is the best knife for realistic knife training, but none of them induce the necessary fear to increase the stress level of the trainee to an adequate level that could be considered realistic.

Relating specifically to stun technology, there has been incredible growth in electro-shock weapons over the past 30 years. Stun technology came out in the 1970's and has grown into a multi-million dollar industry. Originally developed for the law enforcement market, many of these shock devices have made their way into the hands of civilians. These weapons include electro-shock riot shields, electro-shock stun belts (using a remote control), tasers (a device which fires darts connected to a 4 or 5 meter wire into a victim's body or clothes so that an electric shock using roughly 10 watts at 50,000 volts for two to three seconds is inflicted from a distance), shock rods, and stun guns which also shoot tear gas. All of these devices are used as offensive weapons and/or defensive weapons used against the threat of physical harm. None of these weapons are used to train individuals against an edge weapon attack due to there incapacitating nature.

Although shock devices such as Tasers, stun guns, gloves, extending poles as well as cattle prods are known in the prior art, none deliver a shock within a suitable voltage range for non-incapacitating training purposes or for simulating an edge weapon. All of the known prior art devices are generally identified as non-lethal but incapacitating to the subject. Incapacitating generally means requiring sufficient electrical charge in order to incapacitate the person or animal using electrical charges ranging from 50,000 to 300,000 volts.

Searching of the prior art has found that while there are many shocking devices in the area of cattle prods and stun weaponry for incapacitating, there were no shocking devices found to be used as mock weapons or training devices. While there does not appear to be any training devices incorporating shocking to induce a fear response into a trainee, there are many types of training tools, highlighting systems and methods involving non-harmful products. Without an ability to generate a fear response in a trainee though, prior art training tools are largely ineffective.

SUMMARY OF THE INVENTION

According to one aspect of the invention there is provided an electrical shocking device comprising:

a handle for being held in a hand of a person;

a body of non-conductive material having two elongate opposed edges extending in a longitudinal direction from the handle;

first and second contacts spaced apart from one another on at least one of the edges of the body; and a voltage source having opposed terminals for connection to the first and second contacts respectively for delivering a non-incapacitating electrical shock to a person in proximity to the first and second contacts.

The device is designed to visually and functionally replicate a high level of perceived danger during an attack and induces the necessary stress for realistic knife defence training for law enforcement, thereby preparing the officer for the task ahead.

According to a second aspect of the present invention there is provided a method of training a person for defence against an edge weapon, the method comprising:

providing an electric shocking device comprising: a handle; a body of non-conductive material having two elongate opposed edges extending in a longitudinal direction from the handle; and first and second contacts spaced apart from one another on at least one of the edges of the body;

connecting the first and second contacts to opposed terminals of a voltage source respectively;

attacking the person with the electrical shocking device using edge weapon techniques; and delivering a non-incapacitating electrical shock to the person when the person is in proximity to the first and second contacts.

The first and second contacts preferably extend along both opposed edges of the body continuously and spaced apart along the opposed edges of the body.

The body may comprise a spacer of non-conductive material, a first conductive layer spanning between the first contacts on the opposing edges on one side of the spacer, a second conductive layer spanning between the second contacts on the opposing edges on a second side of the spacer and a pair of outer layers of non-conductive material spanning outer sides of the first and second conductive layers respectively.

There may be provided a plurality of the first contacts within a first common plane which are spaced apart from one another in the longitudinal direction of the body and a plurality of the second contacts within a second common plane which are spaced apart from one another in the longitudinal direction of the body.

The first and second common planes are preferably parallel and spaced apart from one another in a lateral direction, wherein spacing between the first contacts in the longitudinal direction and spacing between the second contacts in the longitudinal direction are each greater than spacing between the first and second common planes in the lateral direction.

Preferably the body generally has a knife shape resembling a conventional knife blade locating the first and second contacts at an edge of the knife shape of the body.

The voltage source preferably applies a voltage less of than 20,000 volts across the opposed terminals thereof, and more preferably between 100 and 10000 volts. The voltage source may include a variable control for incrementally adjusting voltage applied across the opposed terminals within a specified range.

The variable control may be located within a recess formed in the handle opposite the body.

There may be provided a trigger on the handle for selectively connecting the first and second contacts with the opposed terminals of the voltage source. The trigger is preferably biased to an off position in which the first and second contacts are disconnected from the voltage source.

In one embodiment, the body may be formed of a flexible material wherein the first and second contacts are coupled to the voltage source by flexible lead wires.

The method of using the device may include applying a suitable voltage across the opposed terminals of the voltage source to produce a visual arc between the first and second contacts.

In operation, the first and second contacts are preferably automatically disconnected from the voltage source after a prescribed time has expired.

Fear of being shocked by the device according to the present invention will induce Sympathetic Nervous System activation and allow for individuals to train in the same acute stress state that they will experience during a real edged weapon attack. By using the device to create transient acute stress during edge weapon training, the time needed to train participants can be shortened. The use of relatively low level electric shocking is not seen as an obvious extension of known shocking devices and therefore the device according to the present invention embodies a unique line of thought. Low level shocking capability coupled with the concept of psychomotor kinesthetic facilitation makes this product truly unique.

A method and device is described herein to assist in training individuals to defend themselves from edge weapon attacks. The device comprises a handle and blade made of non conducting material. The handle houses a battery source and electrical shock generator that is capable of having the voltage raised or lowered by an adjuster protruding from the bottom of the handle. The handle has an on/off button that allows electricity to flow from the battery source into the electric shock generator. Embedded in the blade of the device are two electrodes, or contacts, that run parallel to each other and are only exposed at the edge of the blade. A gap exists between the electrodes. The gap distance and level of voltage is limited to ensure that the device is only capable of inducing pain and not injury, immobilization or incapacitation. When the on button is depressed an electrical charge is generated and sent to the electrodes. When an individual comes into contact with both electrodes, an electric shock will flow through their skin causing pain. This will allow for a method of inducing human fear responses while conducting edge weapon self defense training. It will also allow feedback for when they would have been cut with a real weapon. The knife shaped electric shocking device described herein is designed to facilitate realistic edge weapon self defense training. It typically comprises: a handle and "blade" made of non conducting material; a battery source housed in the handle; an electrical shock generator housed in the handle which is only designed to generate a voltage that will induce pain but not injury, immobilization or incapacitation of a human being; an electric shock generator capable of having the voltage raised or lowered by an adjuster in which the adjuster protrudes from bottom of the handle to allow for quick and easy adjustment; an on/off button mounted on the handle that allows electricity to flow from the battery source into the electric shock generator; two electrical conducting electrodes embedded in the "blade" running parallel to each other and being exposed only at the edge of the blade; a gap distance between the electrodes that ensures a distance that when touched to skin will only induce pain and not injury, immobilization or incapacitation; and an offset pattern that allows for a larger gap space between each electrode without having to increase the width of the "blade".

A method of inducing a physiological and psychological fear response in humans participating in edge weapon self defence training is also described herein. This is accomplished by: utilizing a design that gives the appearance of a real knife; ensuring the gap distance between electrodes allows for a visual spark to jump to allow the training participant to see the knife is capable of shocking them; and producing an electrical shock that will cause physical pain if the two electrodes embedded in the blade come in contact with the skin or arc through the clothing to the skin.

Also described is a method of providing feedback on when and where a human participating in simulated edge weapon self defence training would have been cut in a real attack, by the pain stimulus being a localized stimulus that provides feedback to the participant as to the location and time they were touched by the contacts of the blade body.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
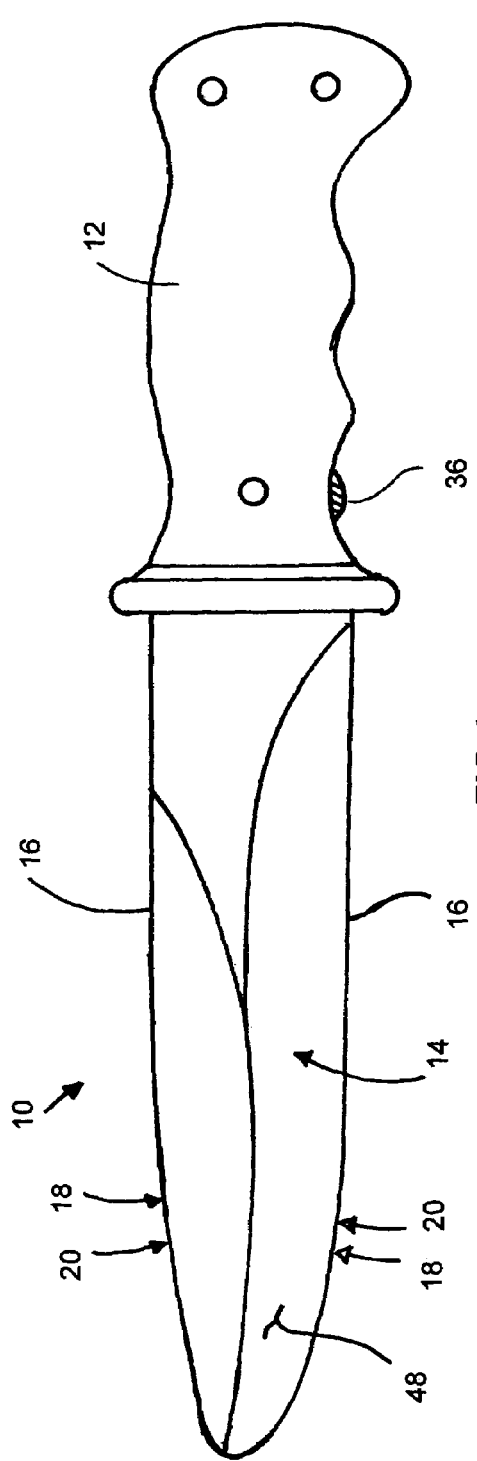
FIG. 1 and FIG. 2 are side elevational and front elevational views respectively of the electrical shocking device.

Referring to the accompanying Figures there is illustrated an electrical shocking device generally indicated by reference numeral 10. The device 10 is particularly suited for use in defence training of a person against edge weapons. While various embodiments are described and illustrated herein, the common features of each will first be described.

The device 10 is generally configured to resemble a handheld knife including a handle 12 which is ergonomically shaped for being gripped in one hand. The handle has a hollow interior for receiving various operating electronics as described further below.

A blade body 14, which is generally flat and elongate in shape, extends in a longitudinal direction from one end of the handle 12. The body includes two opposed elongate edges 16 which extend generally in the longitudinal direction to meet each other at a rounded tip formed at the free end of the blade body 14. Accordingly the edges 16 are continuous with one another about a periphery of the blade body 14.

First contacts 18 and second contacts 20 are provided spaced laterally apart from one another in the direction of the blade body thickness along both of the opposed edges 16. The first contacts 18 are commonly connected internally within the blade body 14 while the second contacts 20 are similarly internally connected with one another, but both the first and second contacts are isolated from one another and separated by insulating and non-conductive material.

Within the hollow handle, a voltage source is provided including opposed terminals 22 for connection to the first and second contacts respectively. The voltage source includes a battery 24 which is typically a replaceable nine volt type. A circuit 26 couples the battery to a transformer 28 which steps up the voltage delivered to the opposed terminals 22. The circuit 26 is coupled to a variable resistor 30 which permits the voltage output of the voltage source to be varied. The resistor is controlled by a dial 32 located within a recess 34 formed in the butt end of the handle 12 opposite the blade body 14. Controlling the variable resistor 30 permits the output voltage across the opposed terminals 22 to be varied between approximately 100 and 10000 volts, though it may be effective to use voltages up to 20,000 volts. In either instance, the voltage source ensures a sufficient voltage across the opposed terminals to cause some pain to the person being contacted but the person is in no way incapacitated or immobilised by a stunning electrical shock.

A trigger 36 is connected to the circuit 26 to effectively turn the device on and off. The trigger generally comprises a push button biased towards the off position and which is located on a leading side of the handle near the blade for readily depressed by an index finger of a person holding the device in their hand.

Turning now more particularly to the first and second embodiments as illustrated in FIGS. 1 through 3 and FIGS. 4 through 6 respectively, the blade body 14 is shown constructed in a layered manner. In each instance a center spacer layer 38 is provided of insulated non-conductive material. A first conductive layer 40 is provided on a first side of the spacer 38. The first conductive layer 40 generally comprises a conductive plate spanning between the first contacts on the opposing edges and along the tip of the blade body. All of the first contacts are thus located in a first common plane 42 spanning in a longitudinal direction of the blade body. Central portions of the plate which form the first conductive layer 40 may be cut out to reduce weight and save material during manufacturing, but the first contacts remain commonly connected to a respective one of the opposed terminals 22.

Similarly a second conductive layer 44 is provided on a second side of the center spacer 38. The second conductive layer 44 also comprises a plate of conductive material which spans the second contacts on opposing edges and the tip of the blade body so that all of the second contacts are provided within a second common plane 44 parallel and spaced from the first common plane 42. The second conductive layer 44 may also include weight and material saving cut outs formed centrally therein.

Two outer layers 48 of insulating and non-conductive material span the outer sides of the first and second conductive layer respectively. The outer surface of the outer layers 40 are suitably shaped to provide the appearance of a conventional double edged knife. Spacing between the first and second conductive layers is typically less then one eight of an inch so as to provide a sufficiently narrow gap that an electrical arc will span therebetween when voltage is applied to the opposed terminals 22.

For manufacturing, the handle 12 and blade body 14 are integrally moulded together in two longitudinally extending halves, each including half of the handle and a respective one of the outer layers of the blade body formed integrally. Suitable fasteners in the handle selectively join the two halves together to enclose the hollow interior of the handle during assembly. The halves remain selectively separable for accessing the electronics as required, for example when replacing the battery.

Figure 2:
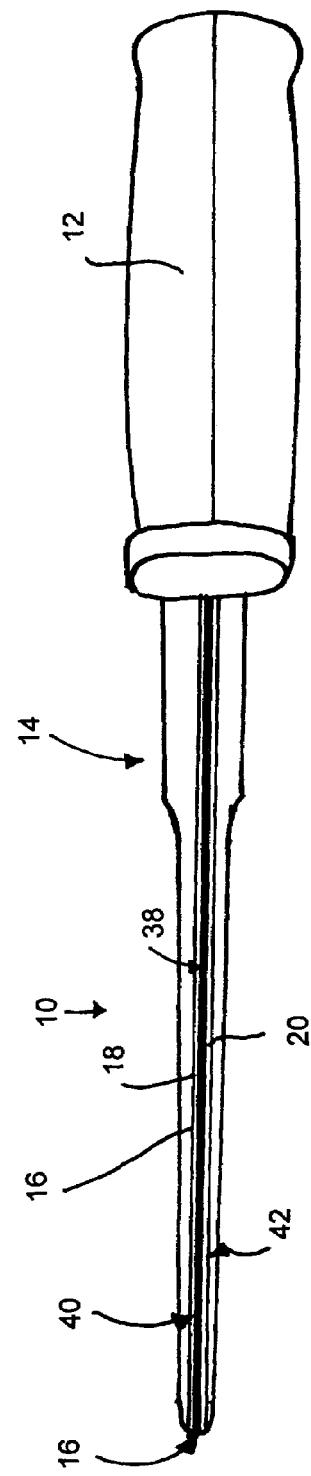
Figure 3:
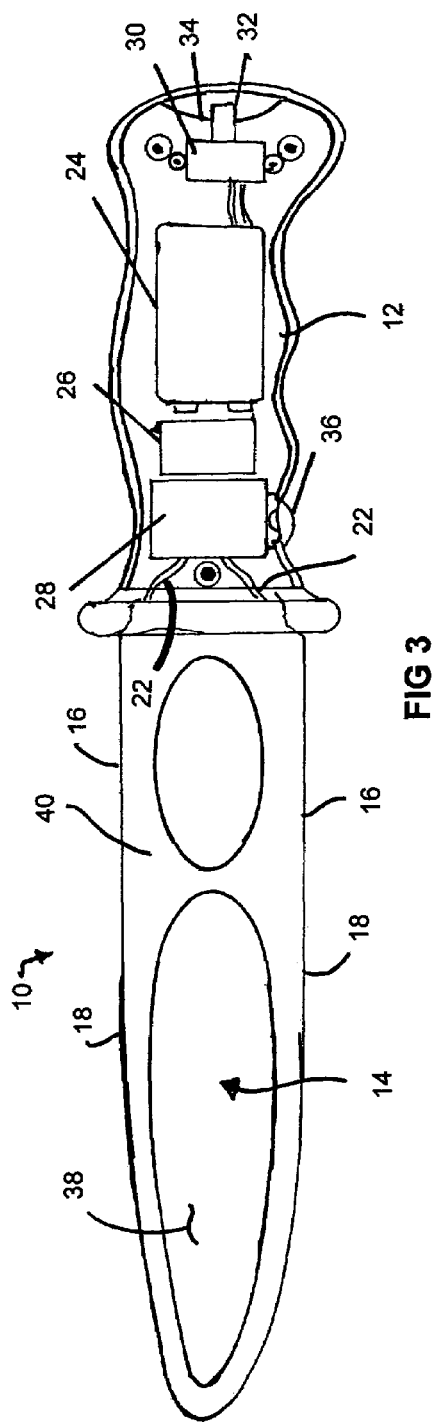
FIG. 3 is a partly sectional, side elevational view of the device according to FIG. 1.

Turning now more specifically to FIGS. 1 through 3, the first and second contacts are each formed to extend continuously in the longitudinal direction along both of the opposed edges and across the rounded tip therebetween. Due to each of the first and second contacts being formed continuously along the peripheral edge of the blade body, spaced apart from one another on both of the opposed edges of the body, the spacing of the gap between the first and second contacts is determined simply by the thickness of the center spacer 38 and accordingly the spacing between the first and second conductive layers 40 and 44.

Figure 4:
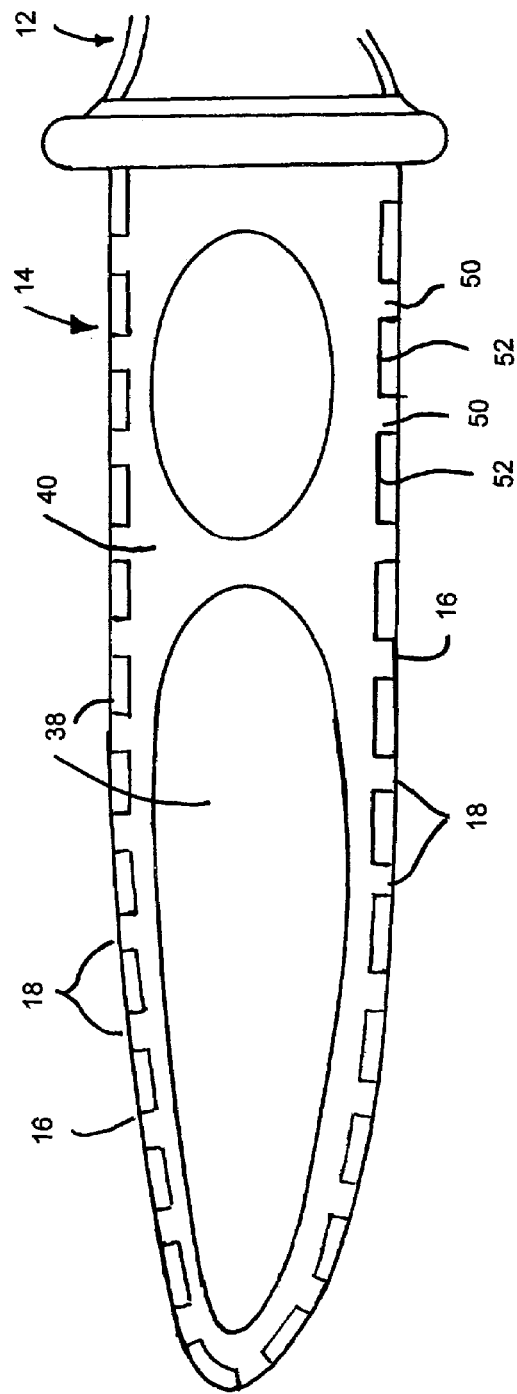
FIG. 4 is a partly sectional, side elevational view of the blade body of a further embodiment of the device with one of the outer layers removed.
Figure 5:
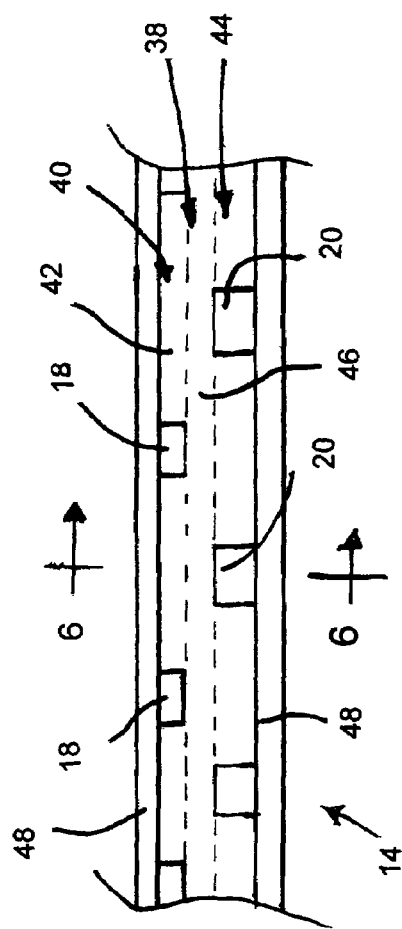
FIG. 5 is a plan view of the edge of the blade body according to FIG. 4.
Figure 6:
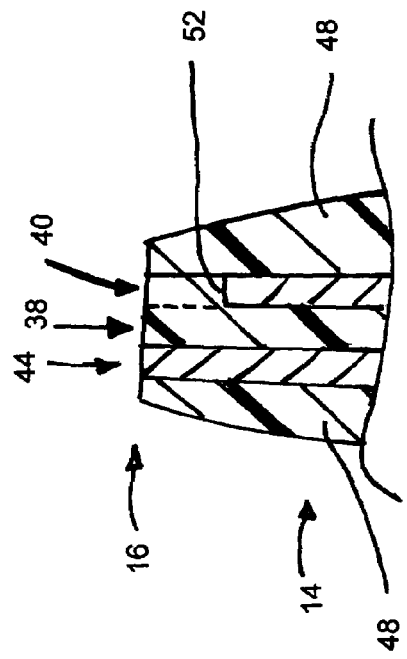
FIG. 6 is a sectional view along the line 6-6 of FIG. 5.

As shown in FIGS. 4 through 6, the first and second conductive layers may include a toothed edge comprising alternating projections 50 forming the contacts, and recesses 52 between each adjacent pair of contacts. All of the first contacts 18 remain in the first common plane 42 as described above, but the contacts are spaced apart from one another in the longitudinal direction. Length of each recess 52 in the longitudinal direction is arranged to be greater than the length of each projection at the opposed edges. The second contacts 20 are similarly located within the second common plane 46 and are spaced longitudinally from one another greater than each projection 50 extends in the longitudinal direction.

The first and second conductive layers are positioned adjacent one another on opposing sides of the center spacer 38 in a manner such that the projections 50 alternate in the longitudinal direction between alternating first and second contacts respectively. A second contact is thus located spaced between each adjacent pair of first contacts in the longitudinal direction. The longitudinal spacing between adjacent contacts within a single common plane or within a single conductive layer is greater than the spacing between the first and second conductive layers in the lateral direction. By providing longer recesses than projections within each layer, even when staggered, the spacing between opposed first and second contacts is greater than the spacing between the first and second common planes so as to maximize the spacing between the contacts within a confined and minimal blade thickness. Accordingly a bigger arc is provided between the first and second contacts while maintaining a narrow appearance of the blade which is more realistic and better suited to simulation training. The non-conductive material forming the spacer 38 includes projections on alternating sides thereof, along the longitudinal edges for mating within the recesses 52 of each conductive layer.

Figure 7:
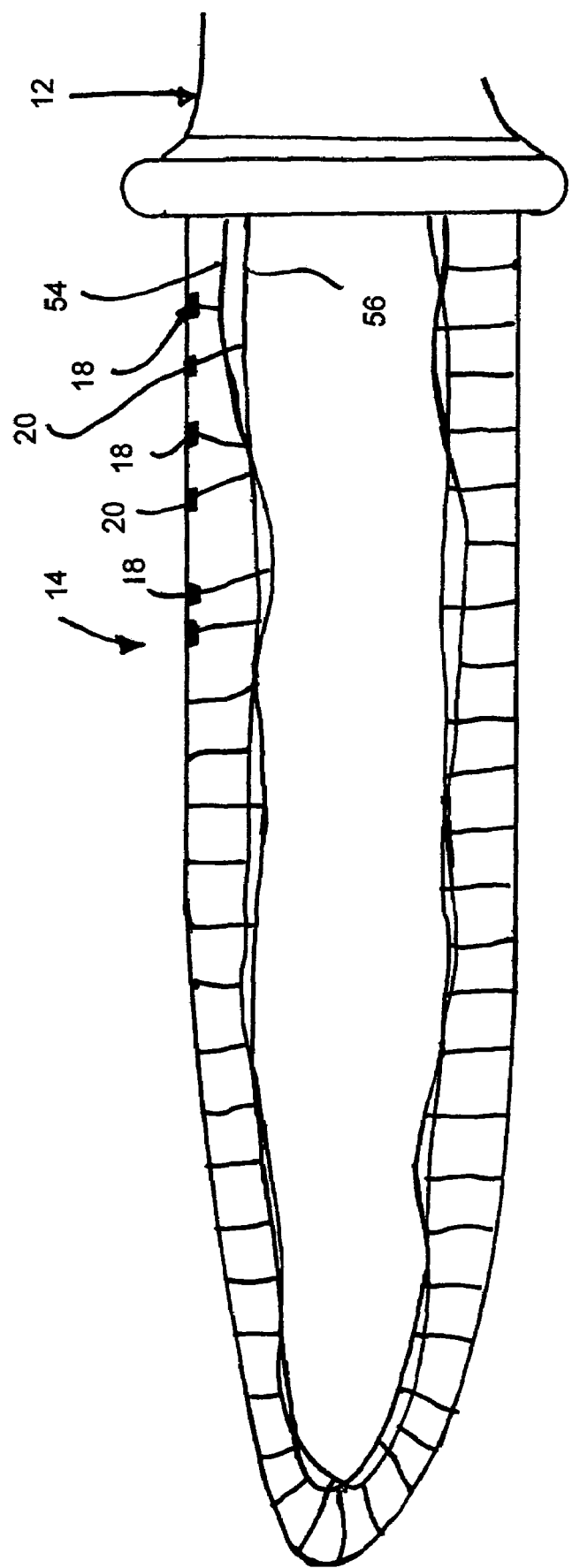
FIG. 7 is a schematic side elevational view of a further embodiment of the blade of the shocking device according to FIG. 1.

As shown in FIG. 7, a further embodiment of the blade body is illustrated in which the body generally is comprised of a flexible non-conductive material supporting the first and second contacts thereon. The contacts in this instance are longitudinally spaced relative to one another along the opposed edges and around the tip of the blade body in an alternating configuration between first and second contacts as in the previous embodiment. A flexible first lead wire 54 is commonly connected between the first contacts while a flexible second lead wire 56 is connected between the second contacts for commonly connecting the first contacts and the second contacts to the respective opposing terminals of the voltage source. The flexible nature of the lead wires and the surrounding flexible and non-conductive material of the blade body ensure that the entire portion of the device identified as the blade portion remains flexible to minimize injuries during training stimulations for defence against edge weapons. Manufacturing of the blade body according to the embodiment of FIG. 7 generally involves injecting the non-conductive material of the blade body about the lead wire which are first connected to the first and second contacts respectively.

All of the embodiments of the shocking device described herein are similarly used for training a person to defend themselves against edge weapons such as a knife. Initially, the device is set at a low voltage to initially teach the person being trained with minimal stress. As defence techniques of the person improve, the voltage is gradually increased to increase the stress levels incurred by the trainee during the training exercise. In time the person learns to apply defensive techniques against edge weapons even when under considerable stress due the knowledge of the potential for pain to be incurred upon contact with the blade body edges. Even at elevated levels of voltage, the shock delivered to the person being trained when touched by the edge of the device only causes pain and is low enough to not be incapacitating or immobilising in any way and so as to not cause any injury whatsoever. The knife shape of the blade body with the contact being provided at the edge of the body simple adds to the realistic effect of the training. The voltage range may be selected to produce a visual arc between the first and second contacts which adds to the stress imposed upon the trainee for more realistic training.

The ability to adjust the voltage is a special feature that allows for the user to set the optimal shock level for different levels of training. To begin training, the device is initially set from 100 volts to 1000 volts to act as a biofeedback tool that is used when conducting Static training where the emphasis is on acquiring the basic physical skills. At this level, the device will not induce pain but will give a tingling sensation that lets the trainee know when the blade comes into contact with them.

At the next level of training, the device is set with a voltage typically between 1,000 volts and 4,000 volts and is used for Stress Inoculation training when conducting stimulus response exercises. The voltage is slowly turned up as the trainee shows success at performing the skill set. This slowly inoculates them to performing under stress.

The last level of training involves operating the device 10 at a voltage between 3,500 and 10,000 volts. This range is used for dynamic training, or what can also be referred to as "State Specific Training". The high level of shock will cause a natural fear response, resulting in physiological and psychological changes similar to those that would be felt in a real edge weapon attack.

The highest level can also be used to identify techniques that are successful when being performed while the body is under physiological and psychological stress. This allows instructors to identify what techniques are realistic and what ones are not.

The overlap in voltage ranges of the different levels of training is based on the fact that each person has a different level of pain tolerance which will result in some variance of the optimum settings used for training.

As described herein, the device 10 is a training knife whose blade produces an electric shock when touched. It is constructed with an insulator core plate that is surrounded by two metal plates being connected to a DC power source. The exterior of the knife is intended to appear as a regular combat knife.

The device 10 is to be designed with a nine volt battery source that when cycled through a transformer generates a maximum of 10000 volts, corresponding to approximately $\frac{1}{10}^{th}$ of the power of a Taser. A cycle rate of 300 oscillations per sec makes it seem as though it discharges constantly. The effect of this design consideration is that when it is exposed to the skin in a sliding action, the feel will be very similar to being cut by a knife edge. Although the shock will not cause injury or incapacitation, it will be painful enough to resemble being cut with a real knife.

The device 10 will be equipped with a potentiometer that is capable of graduating the electrical output from a minimum of 100 to maximum 10000 volts. For safety sake, the electrical discharge is nullified when the blade is in direct contact with person due to a timer operation. In other words if the trainee is immobilized and traps the knife edge against himself for some reason the, knife will not continue to shock him.

The device 10 is designed for defence training that actually induces the same fear you would feel during a real knife attack. Training under these conditions the device will provide a physical and mental environment that induces the necessary fear to ensure realistic knife defence training. The configuration of the exterior of the device as well as the electrical edge of the knife may be varied to accomplish different tasks, for example:

The narrower the insulated core, the stronger the visual effect; as more sparks are seen and heard. This has the potential to elicit a stronger fear response in those who have not been exposed to the device. In this design consideration the shock is less likely to penetrate the clothing of the trainee. This design thought is inline with the concept of incremented stress inoculation which is critical in the teaching of appropriate motor responses.

The design for an asymmetrically opposed saw tooth blade design, as shown in FIGS. 4 through 6, significantly lengthens the spark thereby allowing the shock to easily penetrate clothing. This allows the training to become even more realistic and takes the incremented stress inoculation to a whole new level.

In a further design as shown in FIG. 7, a knife blade body is co-injected together with flexible electrical leads and contacts. The blade and the electrical leads are to be injected at the same time creating a flexible training knife. This device may be used where a stabbing action is required or where fear of injuries are expressed. This concept will offer the ultimate in safety as well as fully a functional electrical shocking device.

The trigger is located on the leading edge of the knife handle where it is most likely to be depressed by the index finger at the first joint. The knife will be always "on" but will only be activated by a pressure contact to this trigger button.

The power source may be varied from 3-9 volts depending on the size and shape of the knife. In an effort to design for other markets such as the Correctional and Martial Arts markets the overall size of the internal works is designed to accommodate as many applications as possible. The power source is designed to be rechargeable.

The device 10 is designed to be manufactured by plastic injection moulding. The handle and blade body may be injected together in two main parts dividing longitudinally to include a left half and a right half that will have the ability to press fit together completing the knife shape of the device. The electronic components will be located in the handle and will be accessible through a cover located on one side of the handle half.

The approximate dimensions of the knife are as follows: Length 11.75 inches, Blade width 1.75 inches, Blade thickness 0.25 to 0.562 inches, Handle length 5.625 inches, Handle width 1.5 inches maximum, Handle thickness 1.25 inches, and Handle butt 2.125 inches.

The device is formed in two parts, each comprising a longitudinally divided half of the blade body and a longitudinally divided half of the handle joined integrally together. The material selection is likely to be a polycarbonate/ABS blend because of the material's dielectric constant rating as well as its surface finish and stiffness. This material's characteristics tend to make a part that does not warp, shrink or fracture under high stress or impact. Polycarbonate/ABS may be permanently bonded together and it can be post processed and painted if necessary.

Other materials which may function satisfactorily include injection resins such as ABS virgin, Delrin, Polyamide and PVC. In the case of the flexible blade the material selection may be one of several elastomers, Polyurethane, Rubber or PVC. The material selected for production will have to meet the aforementioned characteristics as well as be readily available and for a reasonable price.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An electrical shocking device comprising:
   a handle arranged for being held in a hand of a person;
   a body of non-conductive material having two elongate opposed edges extending in a longitudinal direction from the handle;
   first and second contacts spaced apart from one another on at least one of the edges of the body; and
   a voltage source having opposed terminals arranged for connection to the first and second contacts respectively and for delivering a non-incapacitating electrical shock to a person in proximity to the first and second contacts;
   the voltage source being arranged to only apply a non-incapacitating voltage of less than 20,000 volts across the opposed terminals thereof;
   the voltage source including a variable control for adjusting voltage applied across the opposed terminals within a specified range; and
   the variable control being located within a recess formed in the handle opposite the body.

2. The device according to claim 1 wherein the first and second contacts extend along both opposed edges of the body.

3. The device according to claim 2 wherein the first and second contacts are continuous and spaced apart across the opposed edges of the body.

4. The device according to claim 1 wherein the body generally has a knife shape resembling a conventional knife blade locating the first and second contacts at an edge of the knife shape of the body.

5. The device according to claim 1 wherein the specified range is between 100 and 10,000 volts.

6. The device according to claim 1 wherein there is provided a trigger on the handle for selectively connecting the first and second contacts with the opposed terminals of the voltage source, the trigger being biased to an off position in which the first and second contacts are disconnected from the voltage source.

7. The device according to claim 1 wherein the body is formed of a flexible material and wherein the first and second contacts are coupled to the voltage source by flexible lead wires.

8. An electrical shocking device comprising:
   a handle arranged for being held in a hand of a person;
   a body of non-conductive material having two elongate opposed edges extending in a longitudinal direction from the handle;
   first and second contacts spaced apart from one another and extending along both opposed edges of the body; and
   a voltage source having opposed terminals arranged for connection to the first and second contacts respectively and for delivering a non-incapacitating electrical shock to a person in proximity to the first and second contacts;
   the body comprising a spacer of non-conductive material, a first conductive layer spanning between the first contacts on the opposing edges on one side of the spacer, a second conductive layer spanning between the second contacts on the opposing edges on a second side of the spacer and a pair of outer layers of non-conductive material spanning outer sides of the first and second conductive layers respectively.

9. An electrical shocking device comprising:
   a handle arranged for being held in a hand of a person;
   a body of non-conductive material having two elongate opposed edges extending in a longitudinal direction from the handle;
   a plurality of first contacts within a first common plane which are spaced apart from one another in the longitudinal direction of the body;
   a plurality of second contacts within a second common plane which are spaced apart from one another in the longitudinal direction of the body;

the plurality of first contacts and the plurality of second contacts being spaced apart from one another on at least one of the edges of the body; and a voltage source having opposed terminals arranged for connection to the first and second contacts respectively and for delivering a non-incapacitating electrical shock to a person in proximity to the first and second contacts.

10. The device according to claim 9 wherein the first and second common planes are parallel and spaced apart from one another in a lateral direction and wherein spacing between the first contacts in the longitudinal direction and spacing between the second contacts in the longitudinal direction are each greater than spacing between the first and second common planes in the lateral direction.

11. A method of training a person for defence against an edge weapon, the method comprising:

providing an electric shocking device comprising: a handle; a body of non-conductive material having two elongate opposed edges extending in a longitudinal direction from the handle; and first and second contacts spaced apart from one another on at least one of the edges of the body;

connecting the first and second contacts to opposed terminals of a voltage source respectively;

attacking the person with the electrical shocking device using edge weapon techniques;

delivering a non-incapacitating electrical shock to the person when the person is in proximity to the first and second contacts;

incrementally increasing voltage applied across the opposed terminals of the voltage source; and attacking the person with the electrical shocking device using edge weapon techniques subsequent to each increase of voltage applied across the opposed terminals of the voltage source.

12. The method according to claim 11 including forming the body of the shocking device to resemble a knife blade.

13. The method according to claim 11 including applying a suitable voltage across the opposed terminals of the voltage source to produce a visual arc between the first and second contacts.

14. The method according to claim 11 including adjusting the voltage applied across the opposed terminals of the voltage source between 100 and 10,000 volts.

15. The method according to claim 11 including forming the body of the device of a flexible material.

16. The method according to claim 11 including automatically disconnecting the first and second contacts from the voltage source after a prescribed time has expired.

17. An electrical shocking device comprising:

a handle arranged for being held in a hand of a person;

a body of non-conductive material having two elongate opposed edges extending in a longitudinal direction from the handle, the body being generally in the shape of a knife blade and having a rounded tip opposite the handle;

first and second contacts spaced apart from one another on at least one of the edges of the body; and a voltage source having opposed terminals arranged for connection to the first and second contacts respectively and for delivering a non-incapacitating electrical shock to a person in proximity to the first and second contacts;

the body having a pair of outer layers of non-conductive material spanning outer sides of the body on opposing sides of the first and second contacts.

18. An electrical shocking device comprising:

a handle arranged for being held in a hand of a person;

a body of non-conductive material having two elongate opposed edges extending in a longitudinal direction from the handle;

first and second contacts spaced apart from one another on at least one of the edges of the body;

the body having a pair of outer layers of non-conductive material spanning outer sides of the body on opposing sides of the first and second contacts; and a voltage source having opposed terminals arranged for connection to the first and second contacts respectively and for delivering a non-incapacitating electrical shock to a person in proximity to the first and second contacts.

* * * * *